No. 731,196. PATENTED JUNE 16, 1903.
G. MARTIEN.
CAP NUT AND WASHER FOR VEHICLE SPINDLES.
APPLICATION FILED OCT. 27, 1902.
NO MODEL.
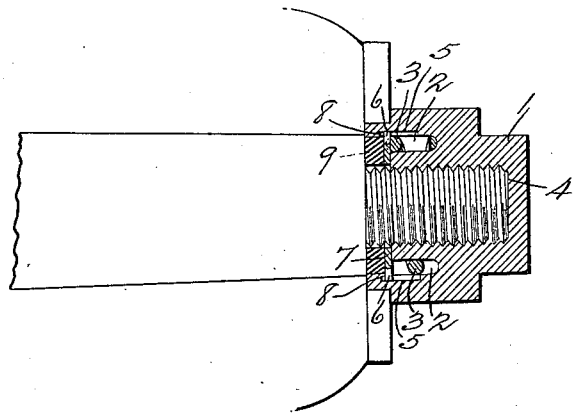
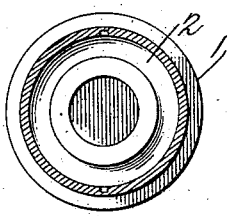
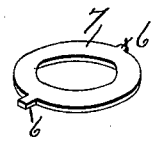
Inventor
G. Martien,
Witnesses
George Hilton
By H. B. Willson & Co.
Attorneys No. 731,196.

Patented June 16, 1903.

UNITED STATES PATENT OFFICE.

GILBERT MARTIEN, OF MANSFIELD, OHIO.

CAP-NUT AND WASHER FOR VEHICLE-SPINDLES.

SPECIFICATION forming part of Letters Patent No. 731,196, dated June 16, 1903.

Application filed October 27, 1902. Serial No. 128,983. (No model.)

*To all whom it may concern:*

Be it known that I, GILBERT MARTIEN, a citizen of the United States, residing at Mansfield, in the county of Richland and State of Ohio, have invented certain new and useful Improvements in Cap-Nuts and Spring-Washers for Vehicle-Spindles; and I do declare the following to be a full, clear, and exact description of the invention, such as will enable others skilled in the art to which it appertains to make and use the same.

My invention relates to improvements in cap-nuts and spring-washers for vehicle-spindles; and it consists in the peculiar construction and combination and arrangement of devices hereinafter described and claimed.

The object of my invention is to effect improvements in the construction of a cap-nut for a vehicle-spindle and to combine therewith a washer and a spring to support the same and to compensate for the wear thereof to prevent endwise movement of the wheel on the spindle.

In the accompanying drawings, Figure 1 is a sectional view of a cap-nut and spring-supported washer embodying my improvements, showing the same in operative position on the spindle of a vehicle and bearing against the outer end of the hub of a wheel thereon, a portion only of the spindle and of the hub being shown. Fig. 2 is a sectional view of the cap 2, taken on the plane indicated by the line *a a* of Fig. 1. Fig. 3 is a detail perspective view of the washer, and Fig. 4 is a similar view of the spring which operates the washer.

In the embodiment of my invention I provide the cap-nut 1, which may be either of the form here shown or of any other suitable form, with an annular recess 2 on its inner side, in which recess is seated a spring 3, which is here shown as a coil-spring. The annular recess 2 is concentric with the recess 4 of larger diameter at the inner side of the cap-nut. In opposite sides of the recess or bore of the cap-nut are longitudinal grooves 5, in which operate the radially-projecting spurs 6 of the washer 7. The latter is made of suitable metal and is of suitable thickness and size. This washer bears against the inner side of the spring 3 and is pressed thereby against the outer end of the hub of the wheel. As the washer wears the spring compensates for the wear thereof, so that lost motion is prevented and any tendency of the wheel to move endwise on the spindle is obviated. As here shown, the outer ends of the grooves 5, in which the studs or spurs 6 operate, are upset, as at 8, to close them; but the said grooves may be closed at their outer ends by any other suitable means. In practice and as here shown I prefer to employ a washer 9 of the usual construction, which may be made of leather or any other suitable material, between the washer 7 and the outer end of the vehicle wheel-hub.

While the washer 7 is here shown as provided with a pair of radially-projecting studs 6, I would have it understood that the number of these studs may be varied, and I do not limit myself in this particular. The end of the spring 3, which bears directly against the washer 7, is notched or recessed, as at 10, to receive one of the spurs 6. Thus independent rotation of either the spring or the washer is prevented, the engagement of the studs 6 with the grooves 5 in the cap-nut preventing rotation of the washer 7.

From the foregoing description, taken in connection with the accompanying drawings, the construction, operation, and advantages of my invention will be readily apparent, it is thought, without requiring a more extended explanation.

Various changes in the form, proportion, and the minor details of construction may be resorted to without departing from the principle or sacrificing any of the advantages of my invention.

Having thus fully described my invention, what I claim as new, and desire to protect by Letters Patent, is—

1. A cap-nut having a recess on its inner side and provided with longitudinal grooves, in combination with a washer movable longitudinally in said recess and having studs engaging said grooves, the outer ends of the grooves coacting with said studs to retain the washer in the recess, and a spring in the recess bearing against and engaged with the washer, said spring and washer having coacting devices to prevent rotary movement of the spring, substantially as described.

2. A cap-nut having an annular recess on its inner side provided with a longitudinal groove closed at its outer end, in combination with a washer movable longitudinally in the recess and having a stud engaging said groove, the outer end of the latter coacting with the stud to retain the washer in the recess, and a spring in the recess and bearing against the washer, substantially as described.

In testimony whereof I have hereunto set my hand in presence of two subscribing witnesses.

GILBERT MARTIEN.

Witnesses:
S. F. OTTINGER,
N. K. REED.